April 7, 1925.  1,532,810
E. M. GOURLEY
LACE MAKING IMPLEMENT
Filed Jan. 21, 1924
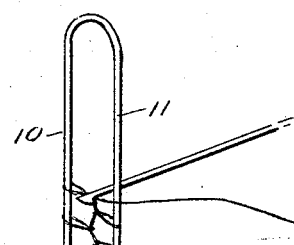
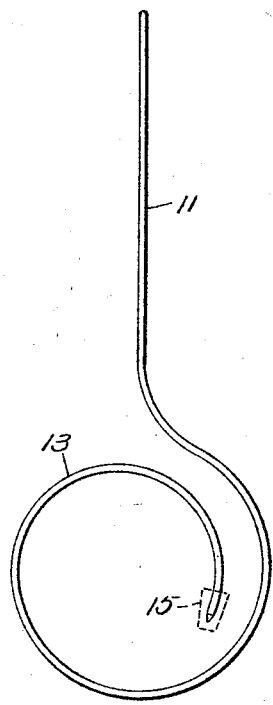
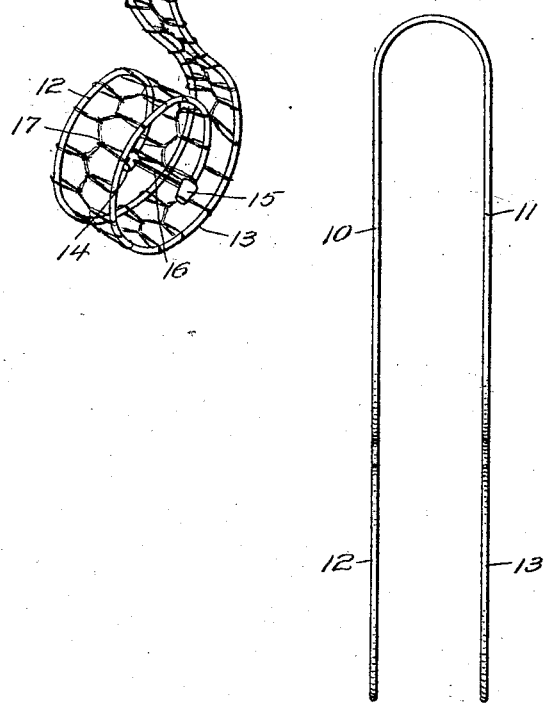
INVENTOR.
Edla M. Gourley.

Patented Apr. 7, 1925.

1,532,810

UNITED STATES PATENT OFFICE.

EDLA M. GOURLEY, OF OVERTON, NEBRASKA.

LACE-MAKING IMPLEMENT.

Application filed January 21, 1924. Serial No. 687,566.

*To all whom it may concern:*

Be it known that I, EDLA M. GOURLEY, a citizen of the United States, residing at Overton, in the county of Dawson and State of Nebraska, have invented certain new and useful Improvements in Lace-Making Implements, of which the following is a specification.

This invention relates to implements employed in manufacturing certain kinds of lace or trimming, and has for one of its objects to provide a simply constructed device of sufficient length to hold a relatively long portion of the lace and preventing it from becoming entangled or soiled during the interlacing operation.

Another object of the invention is to provide a device of this character upon which the lace may be formed and held intact until a certain predetermined quantity has been produced, and then released.

With these and other objects in view the invention consists in certain novel features of construction as hereinafter shown and described and then specifically pointed out in the claims, and in the drawings illustrative of the preferred embodiment of the invention:

Figure 1 is a perspective view of the improved implement with a portion of the "lace" thereon.

Figure 2 is an enlarged side elevation.

Figure 3 is a front elevation of the improved implement without the "lace" thereon.

The improved implement is formed from a single section of wire in elongated U-shape whereby spaced sides 10 and 11 are produced with the terminal of the side portion 10 bent into volute form as shown at 12, and the terminal of the side portion 11 also bent into a like volute form as shown at 13. By this means the length of the side portions 10 and 11 with their volute portions 12 and 13 are relatively long while at the same time the area occupied by the complete implement is not materially increased.

The implement thus constructed is capable of holding a relatively long interlacing of the "lace" or "trimming" and preventing it from becoming entangled or soiled until the full length is completed when it can be removed by drawing it from the free terminals of the volute portions, as will be obvious.

Engaging respectively over the terminals of the volute portions 12 and 13 are detachable caps 14 and 15, preferably connected by a bar 16, and operating to prevent the premature escape of the web or interlacing, indicated conventionally at 17, or holding the "product" upon the implement until completed.

By this means the interlaced web of material is protected and prevented from becoming entangled or soiled, and held intact until completed.

The implement may be of any required size and with as many of the "whorls" as required in the volute portions, to adapt the implement to the production of webs of any required length.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:

1. A device of the class described, comprising an implement formed from a section of wire in elongated U-shape with the terminals bent in volute form, and combined stops and caps on the ends of the volute portions to retain the product, and means for uniting the caps.

2. As a new article of manufacture, an implement formed from a section of wire in elongated U-shape with the terminals in volute form, and combined stops and caps detachably disposed on the ends of the volute portions to prevent the premature escape of the product.

In testimony whereof, I affix my signature hereto.

MRS. EDLA M. GOURLEY.